United States Patent [19]

Svendsen

[11] Patent Number: 4,490,936
[45] Date of Patent: Jan. 1, 1985

[54] POWERED NET HAULING BLOCK WITH TILT MECHANISM FOR NET BALANCING

[75] Inventor: Robert A. Svendsen, Seattle, Wash.

[73] Assignee: Marine Construction & Design Co., Seattle, Wash.

[21] Appl. No.: 483,655

[22] Filed: Apr. 11, 1983

[51] Int. Cl.³ .............................................. A01K 73/00
[52] U.S. Cl. .......................................... 43/8; 254/332
[58] Field of Search ................ 43/8, 7; 254/245, 332, 254/288, 415

[56] References Cited

U.S. PATENT DOCUMENTS

| | | | |
|---|---|---|---|
| 2,639,891 | 5/1953 | Barkley | 254/415 |
| 2,875,547 | 3/1959 | Puretic | 43/8 |
| 3,535,811 | 10/1970 | Demmert | 43/8 |
| 3,643,921 | 2/1972 | Puretic | 43/8 |
| 3,791,625 | 2/1974 | Viljoen | 43/8 |
| 3,964,730 | 6/1976 | Demmert | 43/8 |
| 4,165,830 | 10/1982 | Svendsen | 226/187 |
| 4,354,667 | 10/1982 | Svendsen | 254/332 |
| 4,415,140 | 11/1983 | Deering | 254/371 |

Primary Examiner—Gene P. Crosby
Attorney, Agent, or Firm—Christensen, O'Connor, Johnson & Kindness

[57] ABSTRACT

A net-hauling, power-driven block, the frame of which is suspended from a trolley movable along a track extending between upward extensions of the frame sides. A hydraulic motor on the trolley drives a pinion which engages a sector gear parallel to the trolley track so as to vary the tilt of the block sheave as required to restore seating of the moving net in the sheave groove.

14 Claims, 8 Drawing Figures

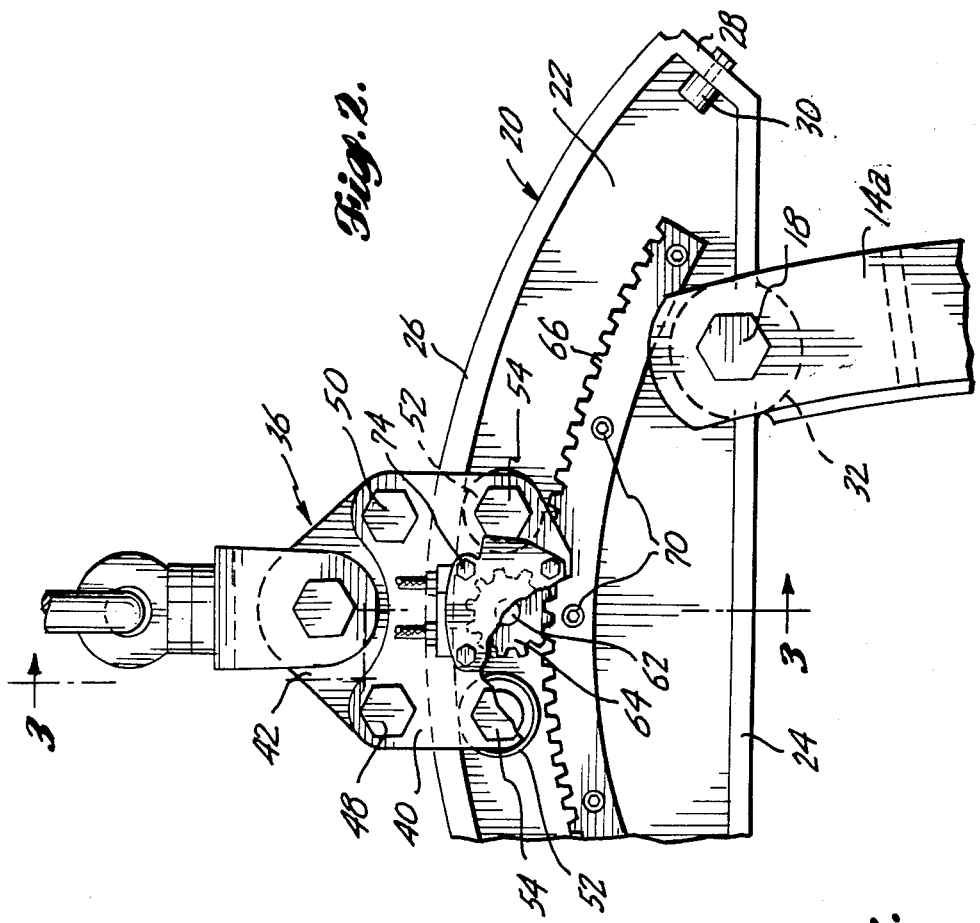
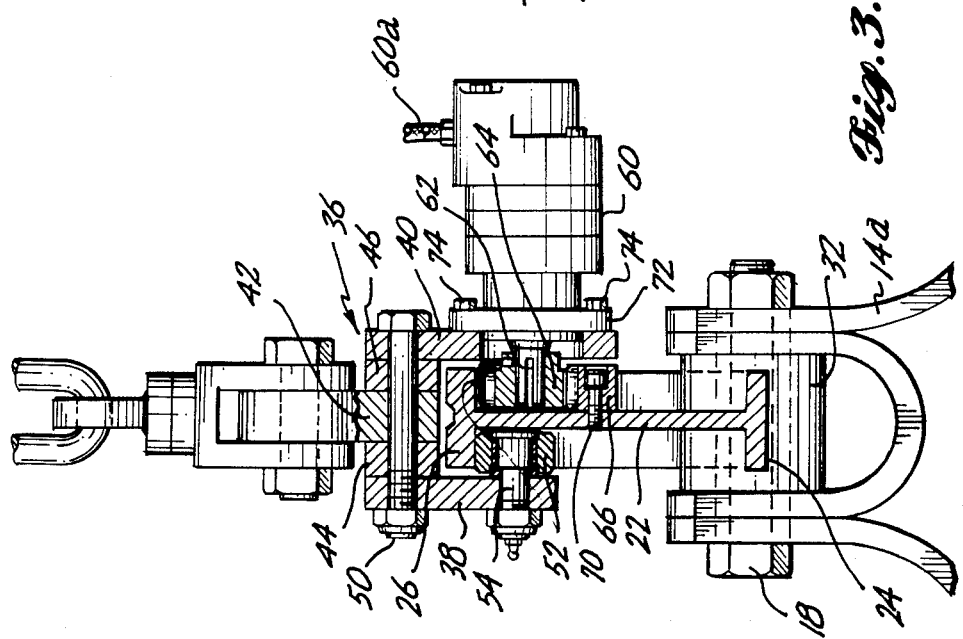

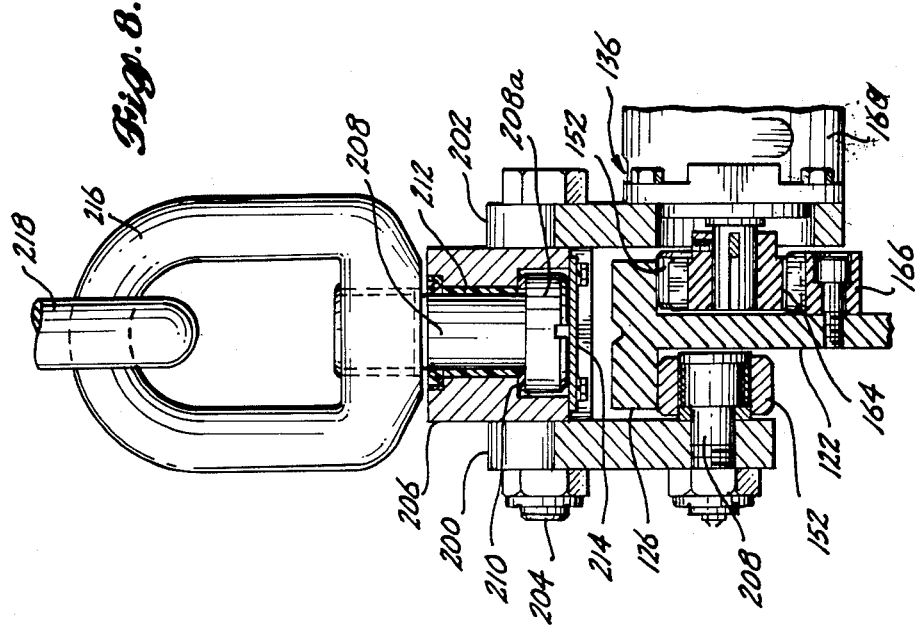
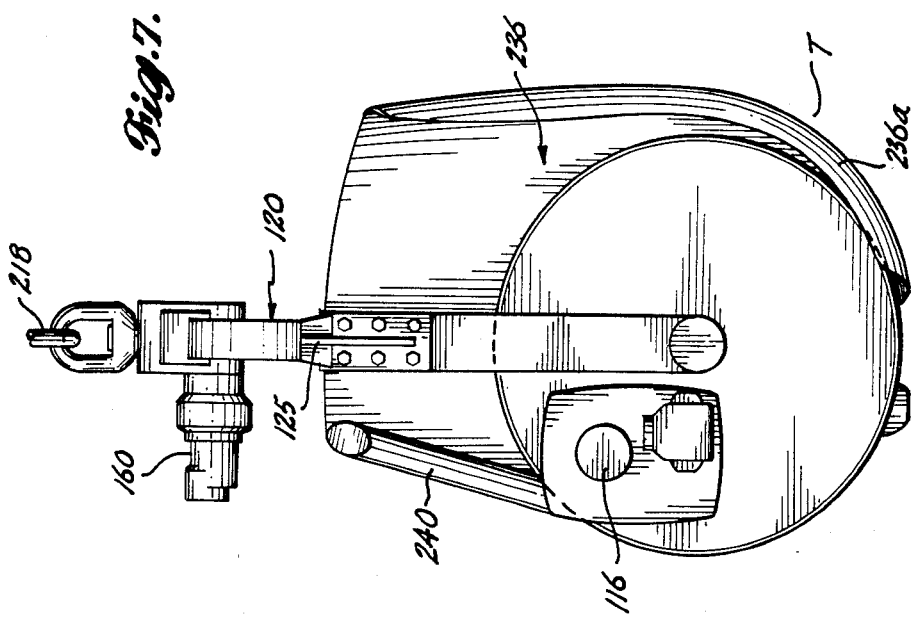

POWERED NET HAULING BLOCK WITH TILT MECHANISM FOR NET BALANCING

BACKGROUND OF THE INVENTION

This invention relates to improvements in power-driven sheaves or blocks for hauling fish nets, such as purse seine nets, and is herein illustratively described by reference to the presently preferred embodiment thereof.

It has for some years been common practice to haul fishing nets draped over a power-driven sheave maintained in an elevated position over the deck of a fishing vessel, dock or barge. Suspended to swing and swivel from a boom or davit, the block addresses itself to the approaching and departing stretches of netting in accordance with the average of the force vectors created by tension in the two stretches of net. Despite this self-positioning action of the block tending to maintain the net centered in the sheave groove, there is a tendency for the cork line side of the net to be advanced faster than the lead line side, with attendant progressive skewing of the mesh out of square with the line of haul. There is a resultant tendency for the approaching netting with its associated lines and floats to pile up at one side of the sheave aggravating the differential. This tendency toward uneven hauling of netting may also be due in part either to directional constraints on the block or the netting, or to fold patterns in the approaching netting incidental to the hauling operation. Howeversuch unbalanced hauling and progressive skewing of the netting may occur, it tends to impair proper compaction and seating of the netting in the sheave groove necessary to gain maximum drive traction on the net and to minimize any tendency of netting to pile up and jam in the throat of the block. It also tends to make more difficult the removal of fish, seaweed and other objects, and to demand extra effort from the crew in straightening and squaring the net as it is being deposited on deck in preparation for subsequent resetting.

Because of these problems, experienced particularly in hauling large nets, block tilting mechanisms have been used heretofore which compensatively adjust the slope angle of the sheave axis of the block when the netting tends to pile up on one side or the other of the sheave during hauling operations. By raising the side of the sheave on which the pileup has occurred, the approaching netting tends to settle more compactly and centrally in the sheave groove as desired. Such prior mechanisms used a transversely arched hanger bar with a track spanning over the top of the block between the frame sides and carried by a track-engaging support trolley hung from the davit or boom. Cables passed from the davit or boom down through guides in the trolley extended to anchor points at the ends of the hanger bar. By drawing in one of the two cables while paying out the other, the trolley, hence the suspension point of the hauling block, was moved along the track to vary the tilt angle of the block.

It was found through experience, however, that hauling blocks rigged with such cable-type tilt mechanisms were bulky and there was a tendency at times for the cables to become fouled, causing undesired interruptions in the hauling and setting operations. Sometimes this occurred under sea and weather conditions making it dangerous, at least inconvenient, to correct the difficulty. A possibly more serious limitation of the cable controlled trolley arrangement was the difficulty at times in achieving precise and immediate control of block tilt. The lengthy tortuous runs of cables tended to develop slack, making use of the cables to position the trolley an exercise in successive approximations. Oftentimes under emergency conditions when accuracy and immediacy of control to change tilt of the block was essential, the cable system proved unsatisfactory. Further problems were experienced at times with edge portions of netting rolling up around the corks and sometimes around the lead line.

A broad object of the present invention is to provide an improved tiltable net hauling, power-driven block which avoids the above-mentioned difficulties and limitations.

A further object hereof is to provide a compact net hauling block having a remotely controlled tilt mechanism which adds no appreciable overall height or vertical length to the block and which is accommodated in the block structure without restricting space needed over the sheave to clear the netting passing through the sheave throat.

A further object is to provide an efficient and non-fouling tilt mechanism in such a hauling block so constructed as to function effectively in any of the varied marine environmental settings and operating conditions in which such hauling blocks are required to be used.

Still other objectives in such a net hauling block include: precision, directness and immediacy of control action of the tilt mechanism; a power-drive mechanism therein suitable for energization by means of hydraulic or electrical systems available on modern fishing vessels; and a tilt mechanism which is not adversely affected by wear over the useful operating life of a well-designed power block in which it may be incorporated.

SUMMARY OF THE INVENTION

In accordance with this invention, the net hauling, power-driven block comprises a frame with a transversely extending bridging member connected at its ends to the frame sides and overarching the block sheave, with a trolley-engaged track on opposite sides of the member and a sector gear paralleling the track on one side. The sector gear teeth extending along the top of the sector gear are engaged by a small motor-driven pinion constituting part of the block support trolley and providing direct and responsive, yet precise, positioning control of the trolley. Since most modern fishing vessels are equipped with safe and reliable hydraulic systems to operate winches and other equipment (electrical drives in an external marine environment are less favored for obvious reasons), it is preferred that the trolley motor drive be hydraulic. The motor is reversible. The bridging member carries trolley stops at its ends, and it includes stiffener flanges projecting from both sides along its top edge, both flanges serving as trolley tracks and the flange on one side protectively overlying the trolley drive pinion in all positions of its travel along the sector gear. The bridging member is thus straddled by the trolley in a balanced support and drive arrangement. Its lower edge underlying the pinion's path of traverse motion is stiffened by a transverse flange serving also as an upper guide of the net passage through the block, keeping net strands, lines and floats away from the drive motor and pinion.

Preferably, the tracks and sector gear members are formed in upwardly convex arcs centered generally in the net groove on the top side of the sheave, although specific configuration in that respect is not critical to the basic function of the system.

In the currently preferred embodiment, outward divergence of the sheave's annular groove sidewalls continues both forwardly and upwardly in stationary net guiding side cowls. Forwardly, the cowls diverge at approximately the sheave groove divergence angle, then undergo a more abruptly rounded flare to provide smooth guidance for the incoming net as it converges on the sheave in any of the varying fan-shaped patterns likely to be encountered. The cowls diverge upwardly over the sheave. Their forward portions, rising from the forward periphery of the sheave, maintain the entrance flare they present at the sheave level. These cowls extend upwardly from the upper rim portions of the rotating sheave substantially to the cross-connecting arched bridging member, thereby providing a smooth, interference-free guidance throat of maximum cross-sectional area for the tension compacted column of netting, floats and lines passing over the sheave. The combined sheave and cowl configuration minimizes net damage due to differential net strand tension or due to obstructions to the free passage of floats, and it also minimizes the tendency in former net haulers of the string of floats to become rolled up in the adjoining netting in entering upon and passing over the hauler sheave. The latter tendency required more or less continuous attention from the hands during net hauling in order to stack the net properly as it descended to the deck for subsequent resetting.

In either illustrated embodiment, positive tilt position control of the block provides a practical means to bring in the net "square" for proper stacking and for ease of final removal and cleaning of seaweed and foreign objects from the net.

These and other features, objects and advantages of the invention will become more fully evident as the description proceeds by reference to the accompanying drawings.

BRIEF DESCRIPTION OF THE DRAWINGS

FIG. 2 is an enlarged fragmentary side elevation, and FIG. 3 is a vertical sectional view illustrating details of the tilt mechanism.

FIG. 7 is a side view of the improved block.

FIG. 8 is an enlarged sectional side view of the novel hanger swivel incorporated in the improved block.

DETAILED DESCRIPTION REFERRING TO DRAWINGS

Figure 1:
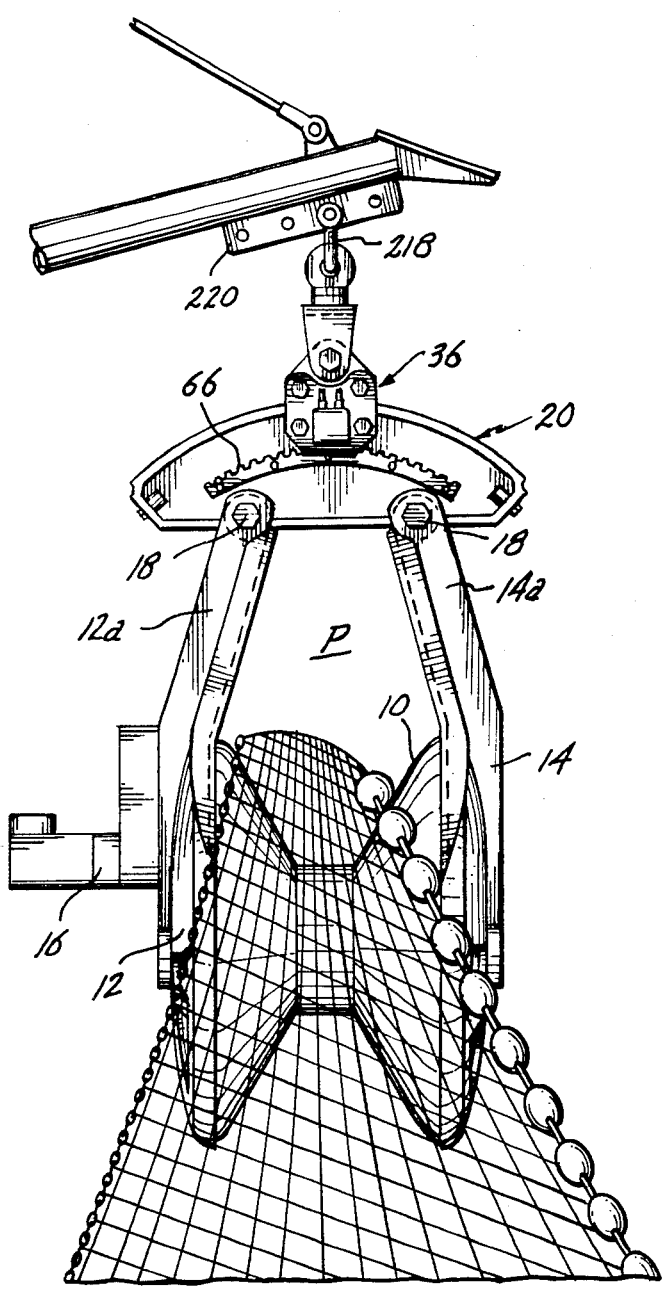
FIG. 1 is a front elevation view of a net hauling block with the improved tilt mechanism of this invention, illustrating the block suspended in vertical position with the trolley operatively positioned midway between the sides of the block frame yoke and with the netting piling up on one side of the block so as to require tilting of the block in order to restore symmetry.

As illustrated in FIGS. 1-4, the net hauling block in basic respects is or may be conventional. It comprises a net-engaging sheave 10 having a reentrant V-shaped annular groove. The surface of the groove is usually rubber-covered for traction purposes yet without preventing some net slippage during net drying operations. The sheave is rotatably mounted between frame sides 12 and 14. A reversible geared hydraulic motor drive unit 16 mounted on one side of the block frame is coupled to the sheave to rotate it one way or the other depending upon operator control. The generally parallel frame sides between which the sheave is mounted for driven rotation by motor unit 16 include upwardly extending arms 12a and 14a, respectively. Each arm is bifurcated at its upper end and apertured to pass a mounting bolt 18 oriented at right angles to the sheave axis. The bifurcated upper ends of arms, spaced apart transversely of the block, are secured by bolts 18 to a bridging member 20 at points near its ends and adjacent to its lower edge.

The bridging member and arms form an arch overlying the sheave and defining a throat or passage for netting being hauled by sheave rotation. The bridging member shown comprises an elongated web plate 22 having a straight lower edge, doubly flanged at 24, and having an upwardly convex, curved upper edge, also doubly flanged at 26. The lower face of one upper edge flange serves as the support trolley track. Its arcuate curvature is preferably of circular configuration centered approximately in the reentrant groove space on the top side of the sheave 10. The bridging member has two generally cylindrical bosses 32 formed integrally with the web plate, bored to pass bolts 18, and of a length to fit snugly between the block arm bifurcations so as to be clamped firmly between them when nuts are tightened on the bolt ends. Bridging member web plate 22 has short upright opposite end edges also doubly flanged at 28. The inside face of one of these at each end supports a trolley stop 30 of rubber or other cushioning material.

In order to support the block in suspension tiltably, the bridging member 20, serving as the top of the frame yoke, is suspended from a power-driven trolley 36. Trolley 36 straddles the flanged arcuate upper portion of the bridging member in a retentive embrace or grip providing secure and stable support for the block and the heavy loads it carries when hauling netting. The trolley frame comprises two mutually parallel side plates 38 and 40. An upwardly projecting central hanger plate 42 and shims 44 and 46 interposed between the central plate and each of the side plates form a laminar assembly held together by bolts 48 and 50. Trolley rollers 52 mounted adjacent to the respective lower inside corners of plates 38 and 40 bear upwardly against the lower faces of the flanges 26 on opposite sides of the upper edge of web plate 22 functioning as the trolley track. Rollers 52 are on short, inwardly projecting stud shafts 54 and lie closely adjacent to the plate 22.

On one side of web plate 22, trolley 36 mounts a geared hydraulic motor drive unit 60. Unit 60 has a short inwardly projecting drive shaft 62 extending through a support bearing in the trolley side plate 40. The shaft carries and drives a pinion 64 positioned close to the adjacent side of web plate 22. The pinion runs in engagement with the top-side row of teeth on an arcuately shaped sector gear 66 paralleling the upper track flange 26. Sector gear 66 is mounted by bolts or rivets 70 on the adjacent side of web plate 22. Geared motor unit 60 itself is secured to the plate 40 by means of a mounting plate 72 and anchor bolts 74.

Figure 4:
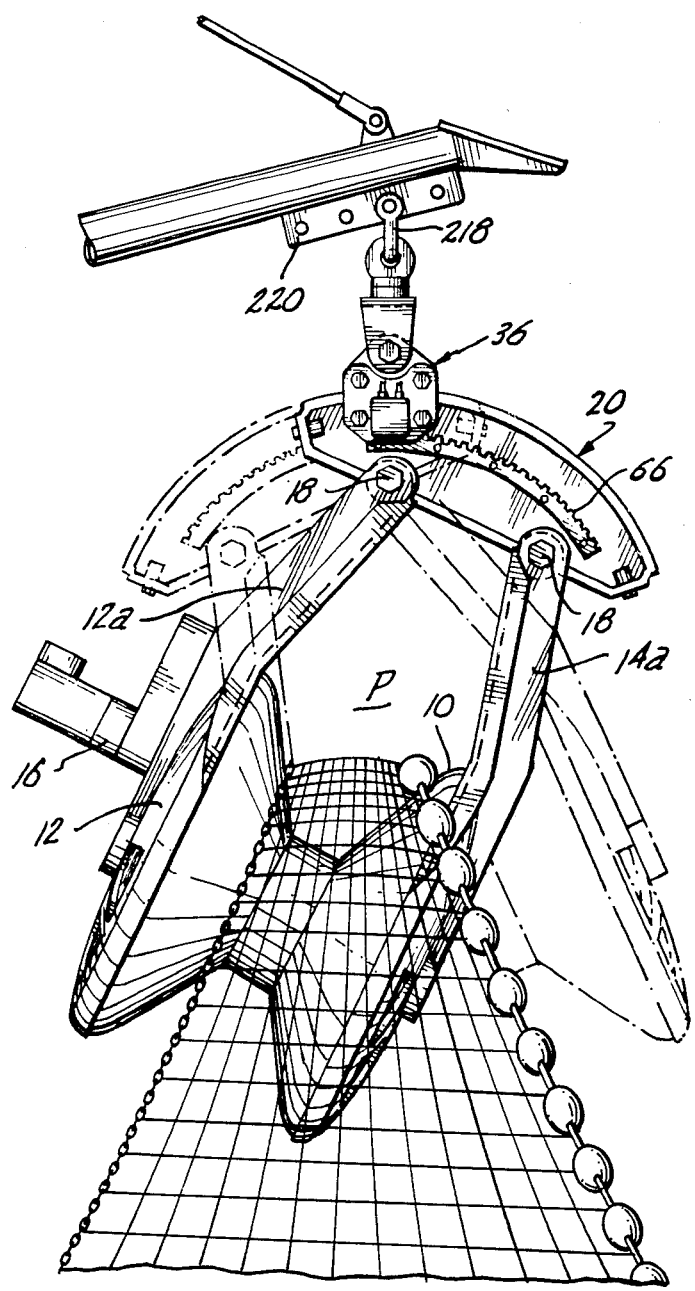
FIG. 4 is a view showing the block tilted to alleviate the pileup of netting as depicted in FIG. 1, and illustrating in the same view by dotted lines the block tilted in the opposite direction.

Motor unit 60 is suitably connected to flexible hydraulic hoses 60a which extend upwardly and along a suitable route to the hydraulics control station from which the hauling operation is monitored and controlled. Application of fluid pressure in one direction of flow through the impeller chamber of motor unit 60 causes the pinion to turn in one direction and thereby move the support trolley 36 along track 26. Reversal of fluid pressure applied in the motor unit causes opposite motion of the trolley. Thus, if as depicted in FIG. 1, the netting tends to pile up on one side of the sheave during hauling, the operator observing this condition simply energizes the hydraulic motor to drive in a direction shifting the location of the trolley along the track flange 26 toward that side of the block. As shown in FIG. 4 by solid lines, this action causes what was the more slowly incoming side of the net to be shifted laterally in the sheave groove into driven engagement with the more rapidly moving outer portions of the spool and thereby to be brought in at a faster rate. Once the net is settled fairly symmetrically in the sheave, the motor unit is energized reversely to return the block to its neutral position (FIG. 1). This is the normal and preferred operating position with the netting settled centrally and compactly within the sheave groove and the net strands compacted together firmly in an interlock so as to minimize any tendency for individual strands to be overloaded and torn. Compacting the moving mass of netting centrally in the sheave groove also minimizes any tendency of the net to slip on the sheave surfaces or to pile up on one side of the block and cause a jam. Hauling is therefore more efficiently performed under these conditions than under the condition of net offset, as shown in FIG. 1. Thus the motor unit 60 is used only as required in order to restore symmetry and balance in the net column as it passes over the sheave.

It will be appreciated that the use of a small motor-driven pinion to drive the trolley back and forth along the bridging member provides a directness, an immediacy, and a precision of positioning tilt control not heretofore attained; also, a stability of positional settings, inasmuch as the hydraulic motor unit may be and preferably is a gear reduction drive unit with a drive train resisting turning of the drive pinion 64 by forces externally applied to the pinion.

It will be observed in the drawings that the objective of a compact and foul-free device is further served by mounting the sector gear 66 on the webbing plate 22 beneath the overlying flange 26. Although sufficient clearance is provided for pinion 64, the pinion is shielded between gear rack 66 and the overlying flange at a location closely adjacent to the plate 22. Should there be a tendency for strands of netting or lines to bulge up into the region of the trolley gear, they will thereby be excluded from interfering with the gear or being torn by operation of the pinion gear. The rollers 52 are likewise shielded by being mounted on the inside face of the trolley side plate 38 where they engage the lower face of the flange 26 as a support track. The flanged lower edge (24) of the bridging member, being spaced downwardly from the trolley assembly, further shields the moving parts from fouling the net system passing through the throat of the device, a condition which is maintained in all tilted positions of the block, i.e., in all trolley positions along track flange 26.

In the modified and improved embodiment of FIGS. 5–8 the sheave or spool 100 is or may be of the same form and materials as in the earlier embodiment. Except for its upwardly arched form (bottom edge also) the bridging member 120 is or may also be similar to that of the first-described embodiment. It has a gear sector 166 mounted on one face of its web plate and a dual flange along its arcuate upper edge serving as tracks for the wheels 152 of the straddling support trolley 136. Pinion 164 on trolley 136 engages the teeth of arcuate gear sector 166 and is driven by hydraulic motor drive unit 116 to move the track and thereby the bridging member lengthwise one way or the other in relation to the support trolley.

This modified embodiment differs from that first described in two principal areas of its design. First is the trolley's suspension mechanism providing increased compactness with durability and strength. Second is the net guide and associated sheave hanger arrangement adding significantly to suspension load strength while minimizing tendencies of the net to jam or to roll up at the edges while passing through the hauler.

The trolley's suspension mechanism comprises the parallel side frame plates 200 and 202 interconnected by bolts 204 which also pass through and clamp the pillow block 206 between the plates, thereby to form spacing between the plates which accommodates the bridge plate, top edge track flanges 126 between them. The pairs of carriage wheels 152 are journalled on stub shafts carried by the frame plates adjacent to their lower corners. Block 206 has a vertical bore through it which passes a coupler pin 208, and a counterbore at the bottom end which receives the pin's head 208a. The pin turns freely in the pillow block. A polytetrafluoroethylene ("Teflon") anti-friction washer 210 is interposed between the base surface of the counterbore in block 208 and the upper annular shoulder of the head 208a, whereas a "Teflon" anti-friction sleeve 212 surrounds the shank or body of pin 208. A retainer plate 214 held by a set of small machine screws threaded into bottom holes in pillow block 206 surrounding the bolt head hold the bolt in the pillow block wherein its upper end projects upwardly through the bottom of coupler ring 216 where it is secured by welding. Ring 216 is linked with a clevis or shackle 218 to suspend the block for universal pivoting from overhead boom 220 as well as for free revolving about suspension pin 208. The universal coupling thus provided is both compact and strong and it allows full and easy freedom of movement of the block for self-addressment to the net properly as conditions vary during a haul.

At the ends, bridging member 120 has flanges 123 from which ears 125 depend in rigid relationship to the bridging member and to which are bolted the respective block side frame members 230 and 232. These carry journals for the ends of sheave support shaft 234 and are formed integrally with respective side cowling structures 236 and 238 serving both parts of the side frames and as sheave shielding net guides. Side cowl 236 is appropriately stiffened and formed to mount the geared hydraulic sheave drive 116 on its exterior face adjacent to the rear of the sheave. There its drive pinion 237 engages the internal ring gear 239 immediately inside the out-turned rim 101 of the sheave 100. The opposite rim of the sheave has a similar flange but one not fitted with gear teeth.

Figure 5:
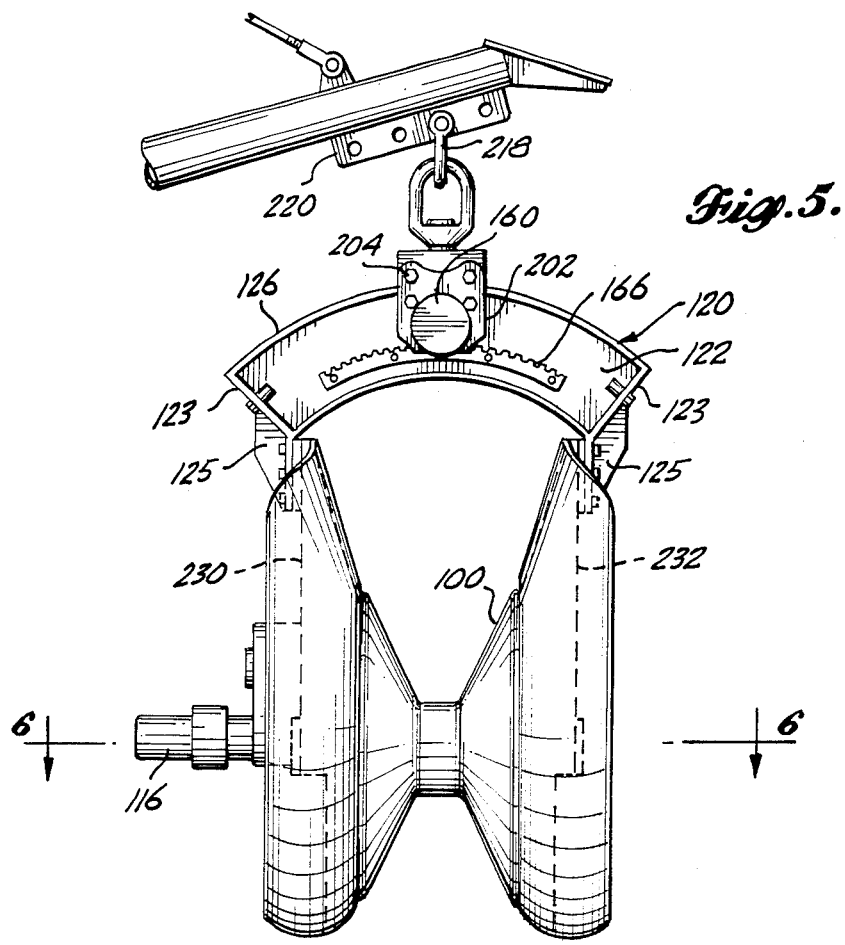
FIG. 5 is a front view of a modified block with improved net guide cowl and support swivel.
Figure 6:
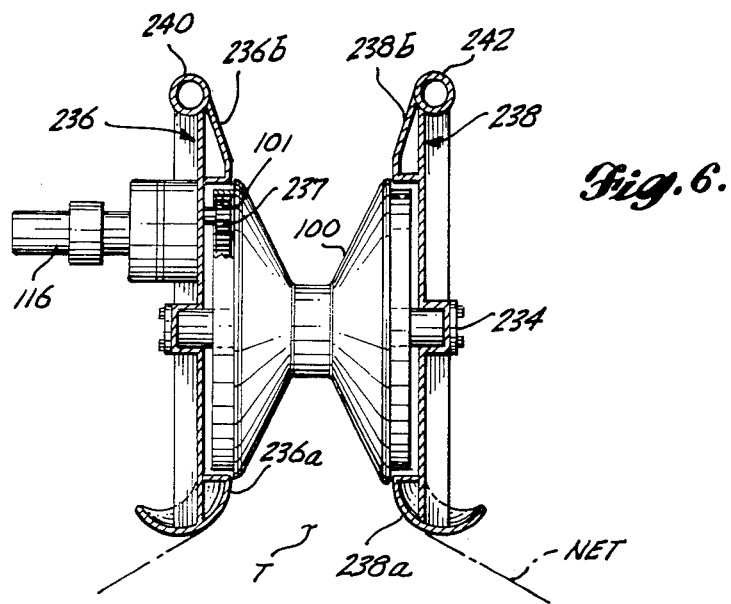
FIG. 6 is a transverse sectional view of the improved block taken on line 6—6 in FIG. 5.

As illustrated, the two side cowls 236 and 238 on the net receiving or incoming side of the block comprise plates with attached moldings 236a and 238a that diverge forwardly from the sheave's forward rim with outward convexity so as to form a generally rounded sheave entrance substantially continuous with its sidewalls. The convex curvature of the forward edge moldings of the cowls is carried downwardly and peripherally around the lower edge of the sheave to a terminus near its axial mid-plane (FIG. 7) based on the determination that approach angles of netting being hauled rarely, if ever, cause it to fan downwardly beyond that location along the sheave's rim. The convex forward edge curvature of the opposite cowl moldings continues almost straight upward from the horizontal mid-plane of the sheave and from its rim upwardly and aft substantially to the top edges of the respective cowls to form net retainer side guides to the height of the ends of the bridging member (FIG. 5). Thus, the convex sided entrance throat of the block provides lateral smooth guidance and confinement of bunched netting passing in a column through the block practically to the height of the overarched bridging member.

The cowls 236 and 238 have rearward edge portions with rearwardly divergent moldings, respectively, that terminate in upright tubular stiffeners 240 and 242 welded to them as rounded edging members. These afford smoothly protective offbear guidance for netting being drawn from the block or for netting settling from the block to deck level by gravity. Above the sheave (FIG. 5), it will be noted that the guide cowls provide guide faces that diverge upwardly to the level of the ends of bridging member 120 and that they thereby provide smooth and confining net guidance. They also function cooperatively with outward divergence of the sheave groove to maintain and augment the wedging force exerted by the cross section of net into the sheave groove and for driving traction.

The invention has been thus illustratively described in its preferred form. However, it is not intended to limit the scope of the claims that follow to the specifics of that design form, inasmuch as variations equivalent thereto are feasible without departing from the novel inventive concepts involved. Without limitation, for example, the briding member configuration may vary and it may be made in one piece, as shown, or as an assembly of pieces, as may the trolley frame. These and other variations are contemplated within the claims that follow.

The embodiments of the invention in which an exclusive property or privilege is claimed are defined as follows:

1. In a net hauling block comprising a grooved sheave over which the incoming net passes, a frame having sides supporting the sheave between them for rotation about a central axis and extending transversely to said axis to help guide the net to and from the sheave and hanger means overarching the sheave and interconnecting the frame sides for suspending the block, including an elongated briding member spaced above the sheave and having a track member extending generally parallel to the sheave axis, and a block support trolley having roller means supportively engaging the track member to move lengthwise thereof so as to tilt the suspended block into varying positions related to trolley position along the bridging member; the combination wherein the bridging member includes a sector gear extending lengthwise thereof substantially parallel to said track member, and wherein the trolley carries a pinion gear engaging the sector gear and a remotely controllable reversible pinion power drive unit, and means to apply drive power to the drive unit for driving the pinion one way or the other, thereby to vary the tilt angle of the sheave.

2. The combination defined in claim 1 wherein the drive unit comprises a hydraulic motor drivingly connected to the pinion.

3. The combination defined in claim 2 wherein the bridging member comprises a horizontally elongated upright web plate having a generally horizontal upper edge with the track member extending along the length of such upper edge and projecting as a flange horizontally laterally therefrom, said trolley having roller means thereon positioned adjacent to the web plate and running on the underside of said flange track member.

4. The combination in claim 3 wherein the sector gear is mounted on one side of the web plate to extend lengthwise thereof parallel to said track member.

5. The combination defined in claim 4 wherein the upright web plate has a flange track member projecting laterally from each side of its upper edge, said trolley having roller means running on the underside of each such flange track member.

6. The combination defined in claim 5 wherein the teeth of the sector gear engaged by the pinion are on the top side of the sector gear with the pinion engaging such teeth being interposed between said sector gear and the flange track member on the same side of the web plate.

7. The combination defined in claim 6 wherein the web plate has a generally horizontal lower edge having opposing, horizontally projecting flanges extending the length of such lower edge to stiffen the web plate and to provide a guide surface restricting upward bulging of net components passing over the sheave.

8. The combination defined in any of claims 2 through 7 wherein each track member engaged by the trolley roller means extends lengthwise in the configuration of an upwardly convex arc.

9. The combination defined in any of claims 2 through 7 wherein each track member engaged by the trolley roller means extends lengthwise in the configuration of an upwardly convex substantially circular arc centered substantially in the sheave groove on the upper side of the sheave.

10. The combination defined in any of claims 2 through 7 wherein each track member engaged by the trolley roller means extends lengthwise in the configuration of an upwardly convex arc and wherein the lower edge of the web plate is substantially parallel thereto.

11. The hauling block defined in claim 1 wherein the frame sides have convexly flared inwardly convergent net guide cowls with lower portions extending peripherally around the net entrance side of the sheave to form a relatively wide net entrance converging inwardly to the rims of the sheave.

12. The net hauling block defined in claim 11 wherein the sheave groove has outwardly divergent sides and the net guide cowls extend across the top of the sheave and project upwardly therefrom in mutually divergent relationship.

13. The net hauling block defined in claim 12 wherein the net guide cowls diverge upwardly from the top of the sheave substantially to the ends of the bridging member.

14. The net hauling block defined in claim 13 wherein the net guide cowls have forward edge portions extending upwardly substantially to the height of the bridging member and of convexly rounded rearwardly convergent form merging downwardly into said cowl lower portions.

* * * * *